US009202478B1

(12) United States Patent
Demtchouk

(10) Patent No.: US 9,202,478 B1
(45) Date of Patent: Dec. 1, 2015

(54) METHOD AND STRUCTURE FOR SOLDERING A LASER SUBMOUNT TO A MOUNTING FACE OF A SLIDER

(71) Applicant: Western Digital (Fremont), LLC, Fremont, CA (US)

(72) Inventor: Alexander V. Demtchouk, Sunnyvale, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/619,030

(22) Filed: Feb. 10, 2015

(51) Int. Cl.
| G11B 5/60 | (2006.01) |
| G11B 5/127 | (2006.01) |
| G11B 5/48 | (2006.01) |
| B23K 35/30 | (2006.01) |
| B23K 1/00 | (2006.01) |
| G11B 5/00 | (2006.01) |

(52) U.S. Cl.
CPC .............. *G11B 5/127* (2013.01); *B23K 1/0008* (2013.01); *B23K 35/3013* (2013.01); *G11B 5/4866* (2013.01); *G11B 5/60* (2013.01); *G11B 2005/0021* (2013.01)

(58) Field of Classification Search
CPC ............. G11B 5/60; G11B 5/33; G11B 21/20
USPC .................................. 360/234, 234.2–234.9
See application file for complete search history.

(56) References Cited

U.S. PATENT DOCUMENTS

| 3,663,184 A | 5/1972 | Wood et al. |
| 4,817,854 A | 4/1989 | Tihanyi et al. |
| 5,719,070 A | 2/1998 | Cook et al. |
| 5,990,560 A | 11/1999 | Coult et al. |
| 6,046,882 A * | 4/2000 | Pattanaik et al. ............... 29/878 |
| 6,075,673 A | 6/2000 | Wilde et al. |
| 6,097,575 A | 8/2000 | Trang et al. |
| 6,125,014 A | 9/2000 | Riedlin, Jr. |
| 6,125,015 A | 9/2000 | Carlson et al. |
| 6,130,863 A | 10/2000 | Wang et al. |

(Continued)

FOREIGN PATENT DOCUMENTS

JP 05190973 7/1993

OTHER PUBLICATIONS

Schulte, et al. "Characterization of a novel fluxless surface preparation process for die interconnect bonding", Electronic Components and Technology Conference (ECTC), 2012 IEEE 62nd, (May 29-Jun. 1, 2012), pp. 26-30.

(Continued)

*Primary Examiner* — Allen T Cao

(57) ABSTRACT

A head and a method to manufacture a head are disclosed. A slider is provided and has a mounting face that is opposite but substantially parallel to its air bearing surface. According to an example embodiment, a first plurality of layers may be deposited on the mounting face, including a tin layer, a first underlayer that comprises platinum, and an interface layer disposed between the first underlayer and the tin layer. The interface layer may comprise Ti, V, Cr, Zr, Nb, Mo, Hf, Ta, or W. A submount with an attached laser diode may include a gold layer and be positioned adjacent to the first plurality of layers. The tin layer may then be melted so that the gold layer is dissolved therein, upon solidification attaching the submount to the mounting face by a solder layer that preferably comprises at least 45% gold by weight dissolved in tin.

24 Claims, 11 Drawing Sheets

(56) References Cited

U.S. PATENT DOCUMENTS

| | | | |
|---|---|---|---|
| 6,137,656 A | 10/2000 | Levi et al. | |
| 6,144,528 A | 11/2000 | Anaya-Dufresne et al. | |
| 6,147,838 A | 11/2000 | Chang et al. | |
| 6,151,196 A | 11/2000 | Carlson et al. | |
| 6,178,064 B1 | 1/2001 | Chang et al. | |
| 6,181,522 B1 | 1/2001 | Carlson | |
| 6,181,673 B1 | 1/2001 | Wilde et al. | |
| 6,229,672 B1 | 5/2001 | Lee et al. | |
| 6,236,543 B1 | 5/2001 | Han et al. | |
| 6,246,547 B1 | 6/2001 | Bozorgi et al. | |
| 6,249,404 B1 | 6/2001 | Doundakov et al. | |
| 6,330,131 B1 | 12/2001 | Nepela et al. | |
| 6,339,518 B1 | 1/2002 | Chang et al. | |
| 6,349,017 B1 | 2/2002 | Schott | |
| 6,373,660 B1 | 4/2002 | Lam et al. | |
| 6,378,195 B1 | 4/2002 | Carlson | |
| 6,522,504 B1 | 2/2003 | Casey | |
| 6,538,850 B1 | 3/2003 | Hadian et al. | |
| 6,548,317 B2 | 4/2003 | Taniguchi et al. | |
| 6,583,953 B1 | 6/2003 | Han et al. | |
| 6,646,832 B2 | 11/2003 | Anaya-Dufresne et al. | |
| 6,661,612 B1 | 12/2003 | Peng | |
| 6,665,146 B2 | 12/2003 | Hawwa et al. | |
| 6,690,545 B1 | 2/2004 | Chang et al. | |
| 6,704,173 B1 | 3/2004 | Lam et al. | |
| 6,708,389 B1 | 3/2004 | Carlson et al. | |
| 6,717,773 B2 | 4/2004 | Hawwa et al. | |
| 6,721,142 B1 | 4/2004 | Meyer et al. | |
| 6,744,599 B1 | 6/2004 | Peng et al. | |
| 6,762,123 B2 | 7/2004 | Curro et al. | |
| 6,771,468 B1 | 8/2004 | Levi et al. | |
| 6,796,018 B1 | 9/2004 | Thornton | |
| 6,801,402 B1 | 10/2004 | Subrahmanyam et al. | |
| 6,856,489 B2 | 2/2005 | Hawwa et al. | |
| 6,873,496 B1 | 3/2005 | Sun et al. | |
| 6,912,103 B1 | 6/2005 | Peng et al. | |
| 6,937,439 B1 | 8/2005 | Chang et al. | |
| 6,956,718 B1 | 10/2005 | Kulkarni et al. | |
| 6,972,930 B1 | 12/2005 | Tang et al. | |
| 7,006,330 B1 | 2/2006 | Subrahmanyam et al. | |
| 7,006,331 B1 | 2/2006 | Subrahmanyam et al. | |
| 7,010,847 B1 | 3/2006 | Hadian et al. | |
| 7,019,945 B1 | 3/2006 | Peng et al. | |
| 7,027,264 B1 | 4/2006 | Subrahmanyam et al. | |
| 7,085,104 B1 | 8/2006 | Hadian et al. | |
| 7,099,117 B1 | 8/2006 | Subrahmanyam et al. | |
| 7,168,608 B2 | 1/2007 | Mei | |
| 7,174,622 B2 | 2/2007 | Meyer et al. | |
| 7,245,014 B2 | 7/2007 | Kurita et al. | |
| 7,276,386 B2 | 10/2007 | Miyata et al. | |
| 7,289,299 B1 | 10/2007 | Sun et al. | |
| 7,307,816 B1 | 12/2007 | Thornton et al. | |
| 7,315,435 B1 | 1/2008 | Pan | |
| 7,315,436 B1 | 1/2008 | Sanchez | |
| 7,372,142 B2 | 5/2008 | Ferrara et al. | |
| 7,414,814 B1 | 8/2008 | Pan | |
| 7,436,631 B1 | 10/2008 | Fanslau, Jr. et al. | |
| 7,463,454 B2 | 12/2008 | Mastromatteo et al. | |
| 7,474,508 B1 | 1/2009 | Li et al. | |
| 7,477,486 B1 | 1/2009 | Sun et al. | |
| 7,593,190 B1 | 9/2009 | Thornton et al. | |
| 7,595,963 B1 | 9/2009 | Chen et al. | |
| 7,601,625 B2 | 10/2009 | Noritake et al. | |
| 7,616,405 B2 | 11/2009 | Hu et al. | |
| 7,626,264 B2 | 12/2009 | Yokoyama | |
| 7,729,089 B1 | 6/2010 | Hogan | |
| 7,995,310 B1 | 8/2011 | Pan | |
| 8,018,685 B2 | 9/2011 | Shimazawa et al. | |
| 8,081,400 B1 | 12/2011 | Hu | |
| 8,087,973 B1 | 1/2012 | Sladek et al. | |
| 8,089,730 B1 | 1/2012 | Pan et al. | |
| 8,164,858 B1 | 4/2012 | Moravec et al. | |
| 8,199,437 B1 | 6/2012 | Sun et al. | |
| 8,208,224 B1* | 6/2012 | Teo et al. | 360/245.3 |
| 8,218,268 B1 | 7/2012 | Pan | |
| 8,240,545 B1 | 8/2012 | Wang et al. | |
| 8,254,212 B2 | 8/2012 | Snyder et al. | |
| 8,256,272 B1 | 9/2012 | Roajanasiri et al. | |
| 8,295,012 B1 | 10/2012 | Tian et al. | |
| 8,295,013 B1 | 10/2012 | Pan et al. | |
| 8,295,014 B1 | 10/2012 | Teo et al. | |
| 8,320,084 B1 | 11/2012 | Shum et al. | |
| 8,325,446 B1 | 12/2012 | Liu et al. | |
| 8,325,447 B1 | 12/2012 | Pan | |
| 8,339,742 B1 | 12/2012 | Sladek et al. | |
| 8,339,747 B1 | 12/2012 | Hales et al. | |
| 8,339,748 B2 | 12/2012 | Shum et al. | |
| 8,343,363 B1 | 1/2013 | Pakpum et al. | |
| 8,345,519 B1 | 1/2013 | Pan | |
| 8,418,353 B1 | 4/2013 | Moravec et al. | |
| 8,441,896 B2 | 5/2013 | Wang et al. | |
| 8,446,694 B1 | 5/2013 | Tian et al. | |
| 8,456,643 B2 | 6/2013 | Prabhakaran et al. | |
| 8,456,776 B1 | 6/2013 | Pan | |
| 8,456,961 B1 | 6/2013 | Wang et al. | |
| 8,462,462 B1 | 6/2013 | Moravec et al. | |
| 8,477,459 B1 | 7/2013 | Pan | |
| 8,485,579 B2 | 7/2013 | Roajanasiri et al. | |
| 8,488,279 B1 | 7/2013 | Pan et al. | |
| 8,488,281 B1 | 7/2013 | Pan | |
| 8,490,211 B1 | 7/2013 | Leary | |
| 8,514,522 B1 | 8/2013 | Pan et al. | |
| 8,532,157 B2 | 9/2013 | Cole et al. | |
| 8,533,936 B1 | 9/2013 | Puttichaem et al. | |
| 8,545,164 B2 | 10/2013 | Choumwong et al. | |
| 8,553,365 B1 | 10/2013 | Shapiro et al. | |
| 8,587,901 B1 | 11/2013 | Puttichaem et al. | |
| 8,593,764 B1 | 11/2013 | Tian et al. | |
| 8,599,653 B1 | 12/2013 | Mallary et al. | |
| 8,605,389 B1 | 12/2013 | Pan et al. | |
| 8,611,050 B1 | 12/2013 | Moravec et al. | |
| 8,611,052 B1 | 12/2013 | Pan et al. | |
| 8,623,197 B1 | 1/2014 | Kobsiriphat et al. | |
| 8,624,184 B1 | 1/2014 | Souza et al. | |
| 8,665,566 B1 | 3/2014 | Pan et al. | |
| 8,665,567 B2 | 3/2014 | Shum et al. | |
| 8,665,677 B1 | 3/2014 | Panitchakan et al. | |
| 8,665,690 B1 | 3/2014 | Moravec et al. | |
| 8,693,144 B1 | 4/2014 | Pan et al. | |
| 8,756,795 B1 | 6/2014 | Moravec et al. | |
| 8,758,083 B1 | 6/2014 | Rudy et al. | |
| 8,760,812 B1 | 6/2014 | Chen et al. | |
| 8,770,463 B1 | 7/2014 | Puttichaem et al. | |
| 8,773,664 B1 | 7/2014 | Wang et al. | |
| 8,792,212 B1 | 7/2014 | Pan et al. | |
| 8,792,213 B1 | 7/2014 | Vijay et al. | |
| 8,797,691 B1 | 8/2014 | Tian et al. | |
| 9,070,387 B1 | 6/2015 | Demtchouk | |
| 2006/0157441 A1* | 7/2006 | Arya et al. | 216/13 |
| 2006/0158784 A1* | 7/2006 | Arya et al. | 360/245.9 |
| 2011/0205860 A1 | 8/2011 | Chou et al. | |
| 2012/0163138 A1 | 6/2012 | Gage et al. | |
| 2013/0016591 A1 | 1/2013 | Tomikawa et al. | |
| 2013/0244541 A1 | 9/2013 | Yaemglin et al. | |
| 2013/0270232 A1* | 10/2013 | Shimazawa et al. | 219/121.63 |
| 2013/0277863 A1 | 10/2013 | Zhong et al. | |
| 2013/0279311 A1* | 10/2013 | Hurley et al. | 369/13.02 |
| 2013/0293982 A1 | 11/2013 | Huber | |

OTHER PUBLICATIONS

Zhou et al., "Au/Sn Alloy and Its Applications in Electronics Packaging," Coining, Inc., http://www.coininginc.com/files/admin/english_gold_tin_paper_pdf, downloaded on Feb. 4, 2015, pp. 1-7.

\* cited by examiner

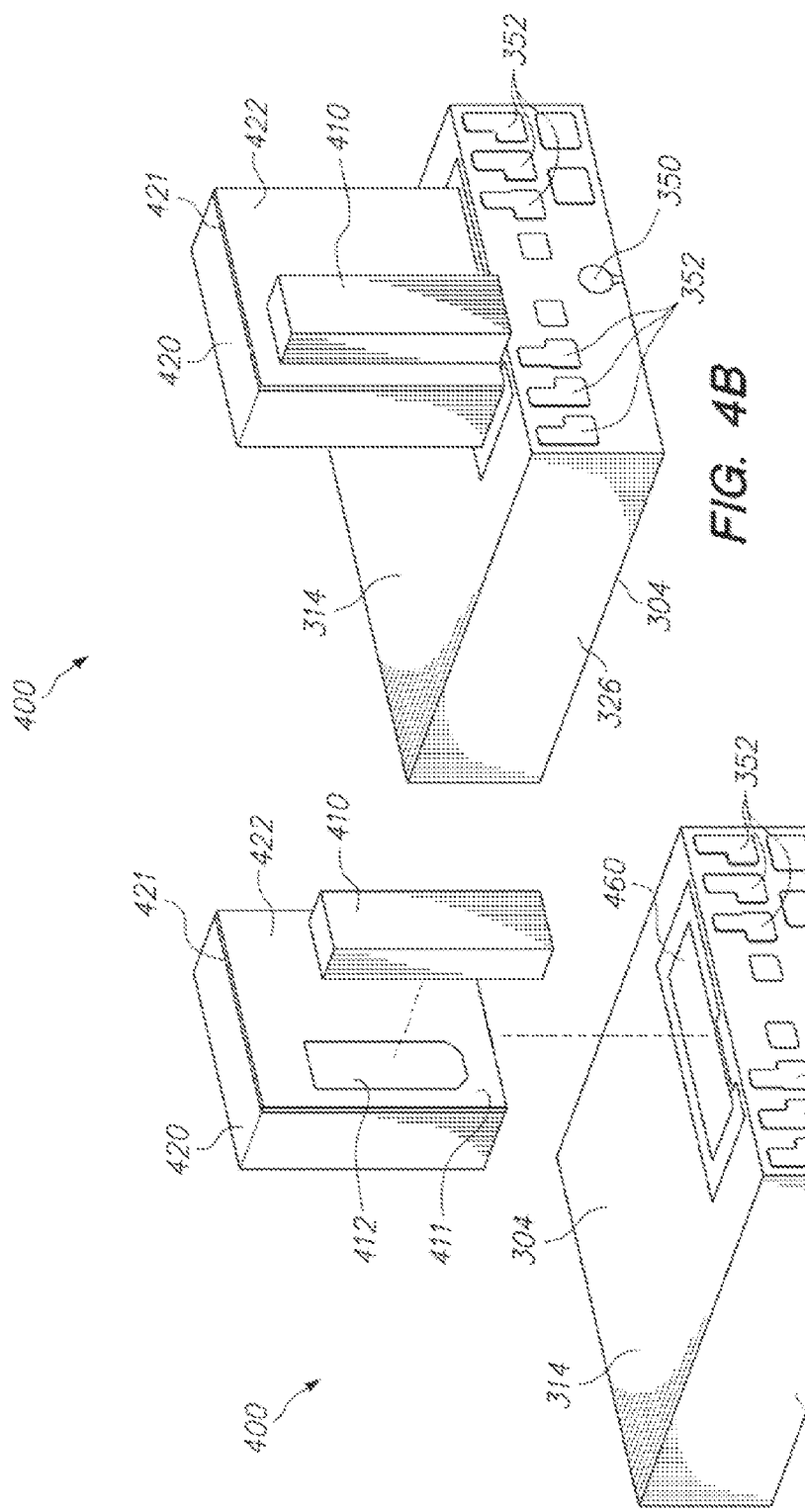

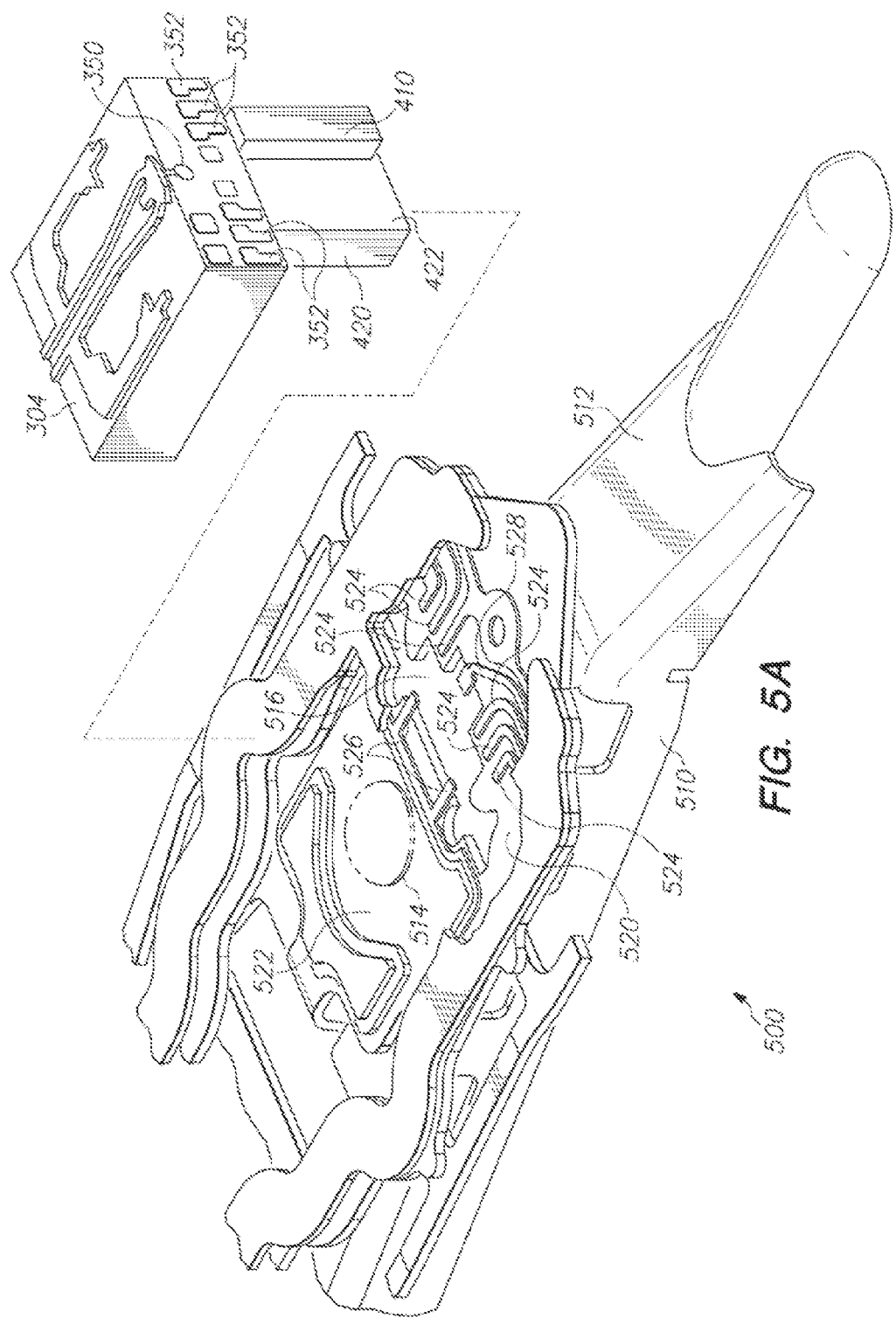

METHOD AND STRUCTURE FOR SOLDERING A LASER SUBMOUNT TO A MOUNTING FACE OF A SLIDER

BACKGROUND

Magnetic hard disk drives retrieve and/or store data in computers and other consumer electronics devices. A magnetic hard disk drive includes one or more heads that can read and write information on a corresponding magnetic surface of a spinning disk. For convenience, all heads that can read are referred to as "read heads" or "heads" herein, regardless of other devices and functions the read head may also perform (e.g. writing, micro-actuation, flying height control, touch down detection, lapping control, localized disk media heating, etc). Each read head is a sub-component of a head gimbal assembly (HGA). The HGA also includes a suspension assembly for holding the head and providing a plurality of electrical connections thereto. The suspension assembly typically includes a fragile laminated flexure to carry the electrical signals to and from the head.

The head typically comprises a slider that includes an air bearing surface (ABS) that faces the magnetic disk surface, a trailing face, and a mounting face that is opposite the ABS and that faces away from the ABS. A magnetic sensor and a plurality of head bond pads are typically disposed on the trailing face of the slider. The mounting face of the slider is typically permanently bonded to a tongue portion of the fragile laminated flexure by an adhesive, in a position such that the plurality of head bond pads are aligned with corresponding bond pads on the laminated flexure.

Conventionally, the head writes tiny magnetic transitions on the magnetic disk surface by applying sufficient magnetic field to the desired microscopic disk surface location to overcome the coercivity of the disk surface material there, and thereby change the remnant field there. However, market demand for disk drives having ever higher data storage capacity has motivated investigation into the possible use of "energy assisted" magnetic recording (EAMR), in which writing is accomplished not only by local application of a magnetic field, but also by local application of laser light for localized heating of the disk surface. EAMR may enable the writing of smaller transitions, and thereby increase the areal density of data stored on the disk surface.

Most proposed EAMR technologies require the addition of a laser light source on the read head. For example, a laser diode may be attached to a laser submount, and the laser submount attached to the mounting face of the slider. Solder alloys have been used for such attachment, for example to enhance thermal and/or electrical conductivity. However, the melting temperature of such a solder alloy may be too high to be tolerated by affected components during the manufacturing process. For example, eutectic 80Au20Sn solder alloy (i.e. having 80% gold and 20% tin by weight) is known to have favorable mechanical properties, but its melting point may exceed the maximum temperature that is practically allowable in a particular manufacturing process. By contrast, 10Au90Sn solder alloy has a lower melting point, but includes the $AuSn_4$ intermetallic that has unfavorable mechanical properties.

Accordingly, there is a need in the art for improved methods and structures to safely, reliably, and practically attach a laser light source for EAMR to a read head.

BRIEF DESCRIPTION OF THE DRAWINGS

FIG. 4A is a perspective view of a head-laser submount assembly (HLSA) capable of including an embodiment of the present invention, having a laser device exploded away from the mounting surface of the head.

FIG. 4B is a perspective view of the HLSA of FIG. 4A, except with the laser device attached to the mounting surface of the head.

FIG. 5A is a perspective view of the distal portion of a head gimbal assembly (HGA) capable of including an embodiment of the present invention, with a head (with mounted laser device) being exploded away from the suspension assembly.

DESCRIPTION OF EXAMPLE EMBODIMENTS

Figure 1:
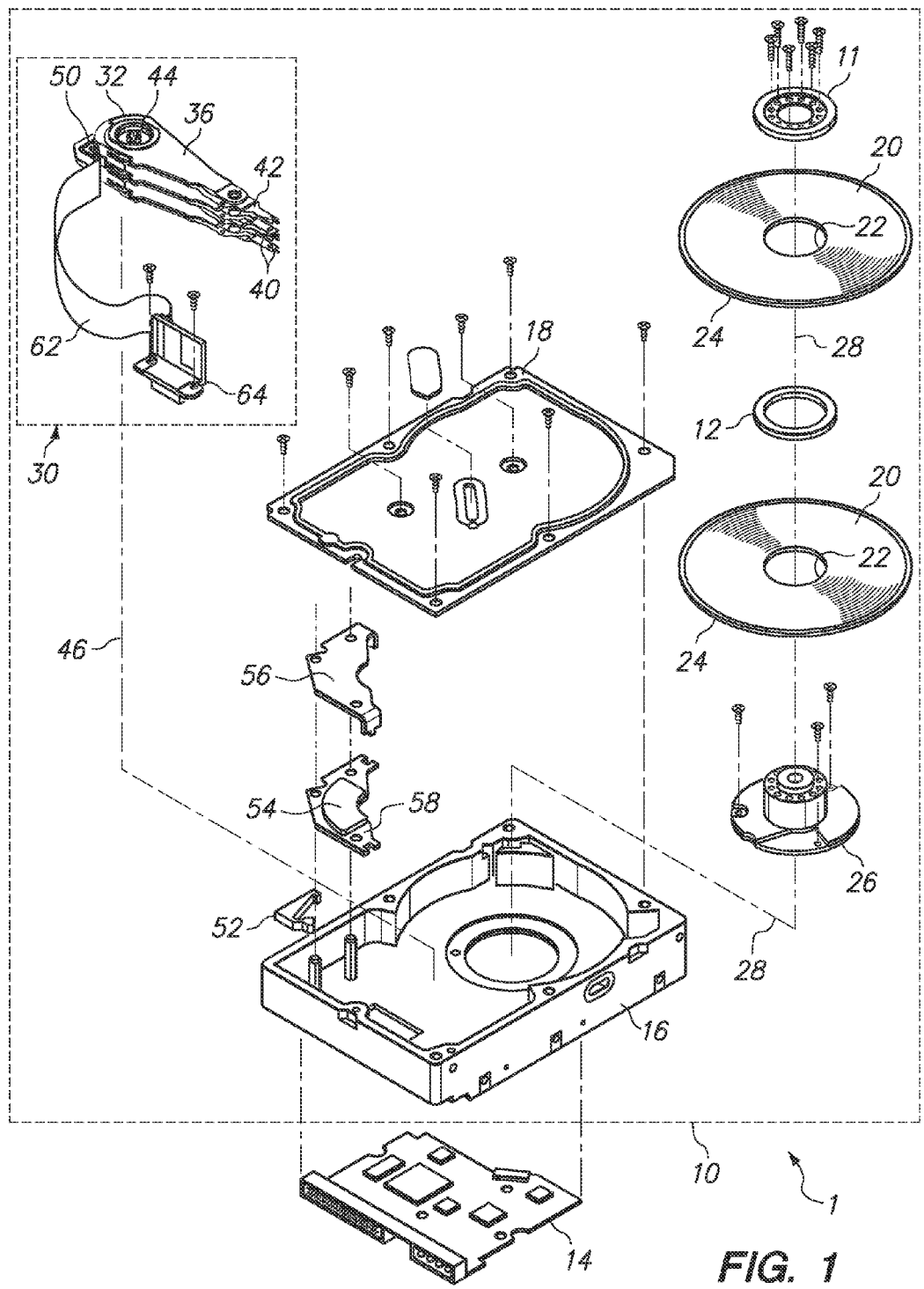
FIG. 1 is an exploded perspective view of a disk drive capable of including an embodiment of the present invention.

FIG. 1 is a perspective view of a disk drive 1 capable of including an embodiment of the present invention. The disk drive 1 includes a head disk assembly (HDA) 10 and a printed circuit board (PCB) 14. The HDA 10 includes a disk drive base 16 and a disk drive cover 18, that together enclose other components of the HDA 10. At least one disk 20 is rotatably mounted to the disk drive base 16 by a spindle motor 26. The HDA 10 optionally includes one or more additional disks 20, also rotatably mounted to the disk drive base 16 by spindle motor 26, with the disks 20 then separated by one or more spacer rings 12.

The disks 20 may comprise an aluminum, glass, or ceramic substrate, with the substrate optionally being coated with a NiP under-layer, at least one thin-film magnetic layer, a diamond-like amorphous carbon protective layer, and a very thin lubricant layer, for example. The disks 20 are annular in shape, having an outer periphery 24 and an inner periphery 22, and may be clamped to a rotating hub of the spindle motor 26, by a clamp 11. The rotating hub of the spindle motor 26 rotates the disks 20 about a disk axis of rotation 28.

The HDA 10 also includes a head stack assembly (HSA) 30 that includes an actuator 32 that is pivotably mounted to the disk drive base 16 by a pivot bearing 44 that is inserted as a cartridge into a bore in the actuator 32. The pivot bearing 44 allows the actuator 32 to pivot about an actuator pivot axis 46. The actuator 32 may be fabricated from any suitable material having sufficient stiffness to weight, for example aluminum, magnesium, beryllium, or stainless steel. The pivot bearing 44 may be retained in the bore by a tolerance ring or may be otherwise retained (e.g. by an adhesive). The angular range of motion of the actuator 32 may be limited by a latch and crash stop mechanism 52. The actuator 32 includes at least one actuator arm 36 that extends away from the pivot bearing 44, and an actuator coil 50 that extends away from the pivot bearing 44 in a direction generally opposite the actuator arm 36.

The actuator coil 50 may fit in a yoke structure that optionally comprises a top plate 56 and a bottom plate 58, to form a voice coil motor (VCM). One or both of the top plate 56 and the bottom plate 58 may support a permanent magnet(s) of the VCM (e.g. permanent magnet 54). The top plate 56 and/or the bottom plate 58 preferably comprise a ferromagnetic metal so as to provide a return path for magnetic flux from the permanent magnet(s) through the yoke structure. The ferromagnetic metal yoke structure including the top plate 56 and the bottom plate 58 is preferably affixed to the disk drive base 16, for example by an adhesive, one or more fasteners, and/or magnetic attraction.

A plurality of head gimbal assemblies 42 may be attached to arms 36 of the actuator 32, for example by swaging. A flexible printed circuit (FPC) 62 (also known as a "flex cable") may also be attached to the actuator 32. Each of the head gimbal assemblies 42 may include a read head 40 that is bonded to a laminated flexure having a flexure tail that is electrically connected to the FPC 62. The FPC 62 can communicate electrical signals, via these electrical connections and via a flex bracket 64, between the head gimbal assemblies 42 and an external electronic system that is disposed on the PCB 14.

The actuator 32, head gimbal assemblies 42, and FPC 62 all may be considered as components of the HSA 30. The HDA 10 may have additional components that are not shown in FIG. 1. For example, the HDA 10 may also include a conventional head loading ramp (not shown), that may be positioned adjacent the disks 20 to facilitate merging of the head gimbal assemblies 42 onto surfaces of the disks 20.

Figure 2:
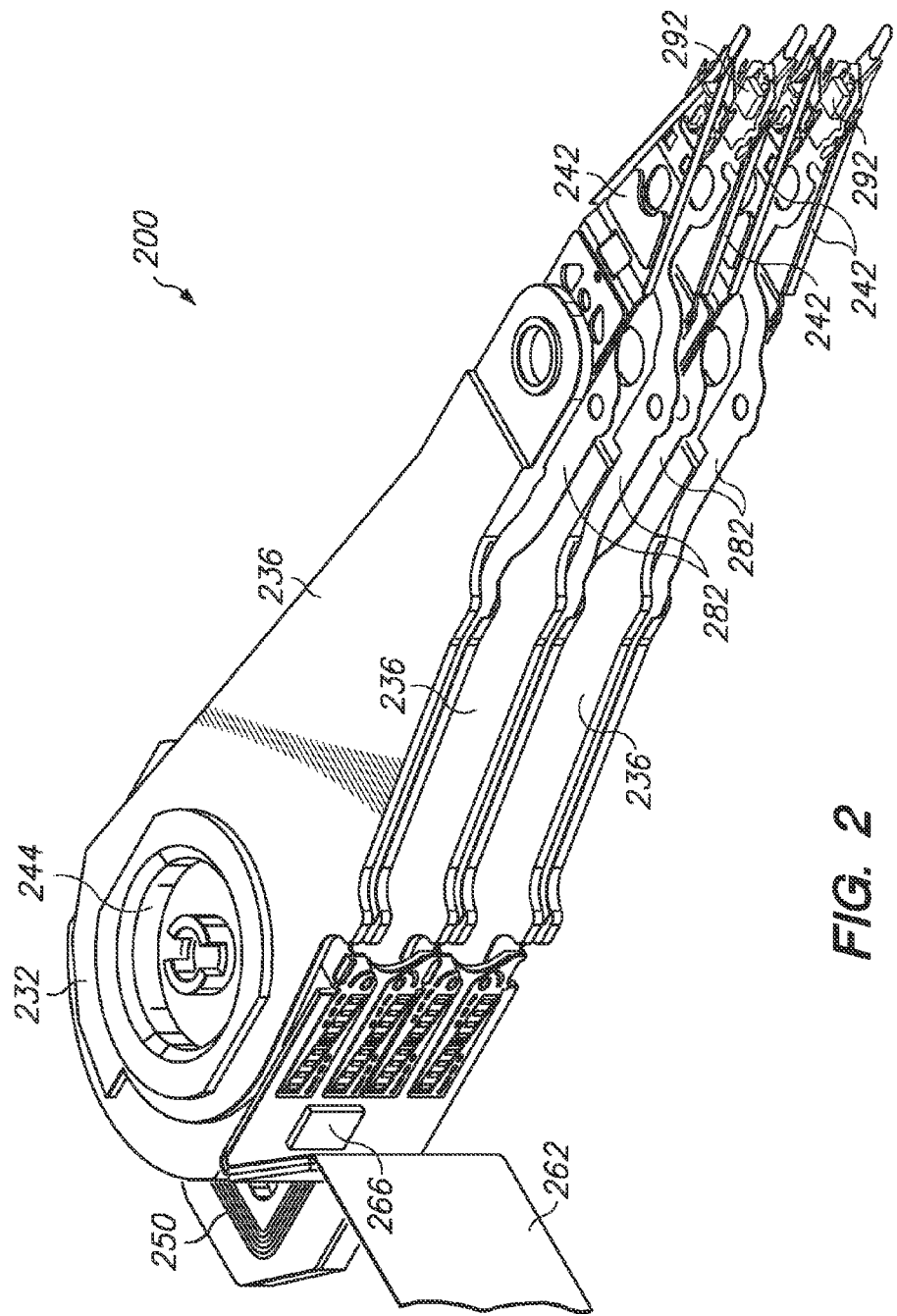
FIG. 2 is a top perspective view of a head stack assembly (HSA), capable of including an embodiment of the present invention.

FIG. 2 is a top perspective view of a head stack assembly (HSA) 200, capable of including an embodiment of the present invention. The HSA 200 includes an actuator 232 pivotably attachable to a disk drive base by a pivot bearing 244 that is inserted as a cartridge into a bore in the actuator 232. The actuator 232 may be fabricated from a suitable metal such as aluminum, magnesium, beryllium, or stainless steel, or a relatively low mass density non-metallic or composite material having sufficient stiffness. The pivot bearing 244 may be retained in the bore by a tolerance ring or may be otherwise retained (e.g. by an adhesive). The actuator 232 includes a plurality of actuator arms 236 that extends away from the pivot bearing 244, and an actuator coil 250 that extends away from the pivot bearing 244 in a direction generally opposite the actuator arms 236.

In the embodiment of FIG. 2, a plurality of head gimbal assemblies (HGAs) 242 are shown to be attached to arms 236 of the actuator 232. Each HGA includes a read head 292 and a suspension assembly to which the read head 292 is attached. Specifically, each read head 292 is attached and electrically connected to a laminated flexure 282 of the suspension assembly of the HGA 242. The suspension assembly of each HGA 242 is shown to be attached to one of the actuator arms 236, for example by swaging. A flexible printed circuit (FPC) 262 is also shown to be attached to the actuator 232. Each laminated flexure 282 includes a plurality of conductive traces, and each laminated flexure 282 has a flexure tail that extends to the FPC 262, where the plurality of conductive traces is connected to the FPC 262 near a pre-amplifier chip 266.

Figure 3:
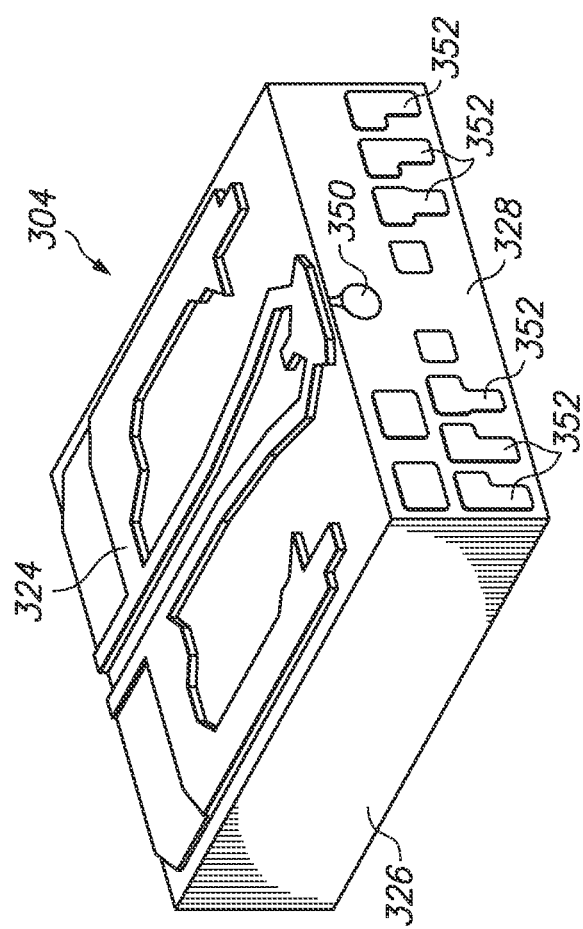
FIG. 3 depicts a head capable of use with an embodiment of the present invention, as viewed from a perspective angle towards the air bearing surface of the head.

FIG. 3 depicts a read head 304, as viewed from a perspective angle towards its air bearing surface 324. The read head 304 comprises a slider 326 which includes the air bearing surface 324, a trailing face 328 that is normal to the air bearing surface 324, and a mounting face (not visible from the view angle of FIG. 3, but which is opposite but substantially parallel to the air bearing surface 324). The air bearing surface 324 may be of any conventional design, and is not restricted to the design shown in FIG. 3. The head 304 also comprises a plurality of head bond pads 352 that are disposed on the trailing face 328 and that are electrically conductive. The head bond pads 352 may comprise gold and/or copper, for example.

In the embodiment of FIG. 3, a magnetic transducer 350 is disposed on the trailing face of the slider 326. The magnetic transducer 350 may include a magneto-resistive read sensor (e.g. a tunneling magneto-resistive read sensor) and a magneto-inductive write transducer, for example. The slider 326 may comprise a ceramic material such as AlTiC, for example.

FIG. 4A is a perspective view of a head—laser submount assembly (HLSA) 400 capable of including an embodiment of the present invention, having a laser device (e.g. a laser diode 410 with a laser submount 420) exploded away from the mounting face 314 of the slider 326 of the head 304. FIG. 4B is a perspective view of the HLSA of FIG. 4A, except with the laser submount 420 soldered to the mounting face 314 of the slider 326. Numerical labels in FIGS. 4A and 4B that are common with those used in FIG. 3 are intended to have the same meaning as that described with reference to FIG. 3, and so for conciseness the description of such numerical labels may not be repeated in the description of FIGS. 4A and 4B.

As shown in FIG. 4A, a first plurality of layers 460 has been deposited on the mounting face 314 of the slider 326. The first plurality of layers 460 may be used to help create a reliable solder bond between the laser submount 420 and the mounting face 314 of the slider 326. Examples of the composition of the first plurality of layers 460 before and after the soldering process will be described subsequently herein.

In the example of FIGS. 4A and 4B, the laser submount 420 includes a patterned metal layer 421 upon which a solder material 412 (e.g. eutectic 80Au20Sn) may be deposited for attachment of the laser diode 410 to a laser diode bonding region 411 of the patterned metal layer 421. The laser submount 420 optionally may also include a probing region 422 of the patterned metal layer 421 to facilitate contact by electrically conductive probing pins during the assembly process, for example to temporarily energize the laser diode 410 to use emitted laser light for alignment during the assembly process.

Figure 5B:
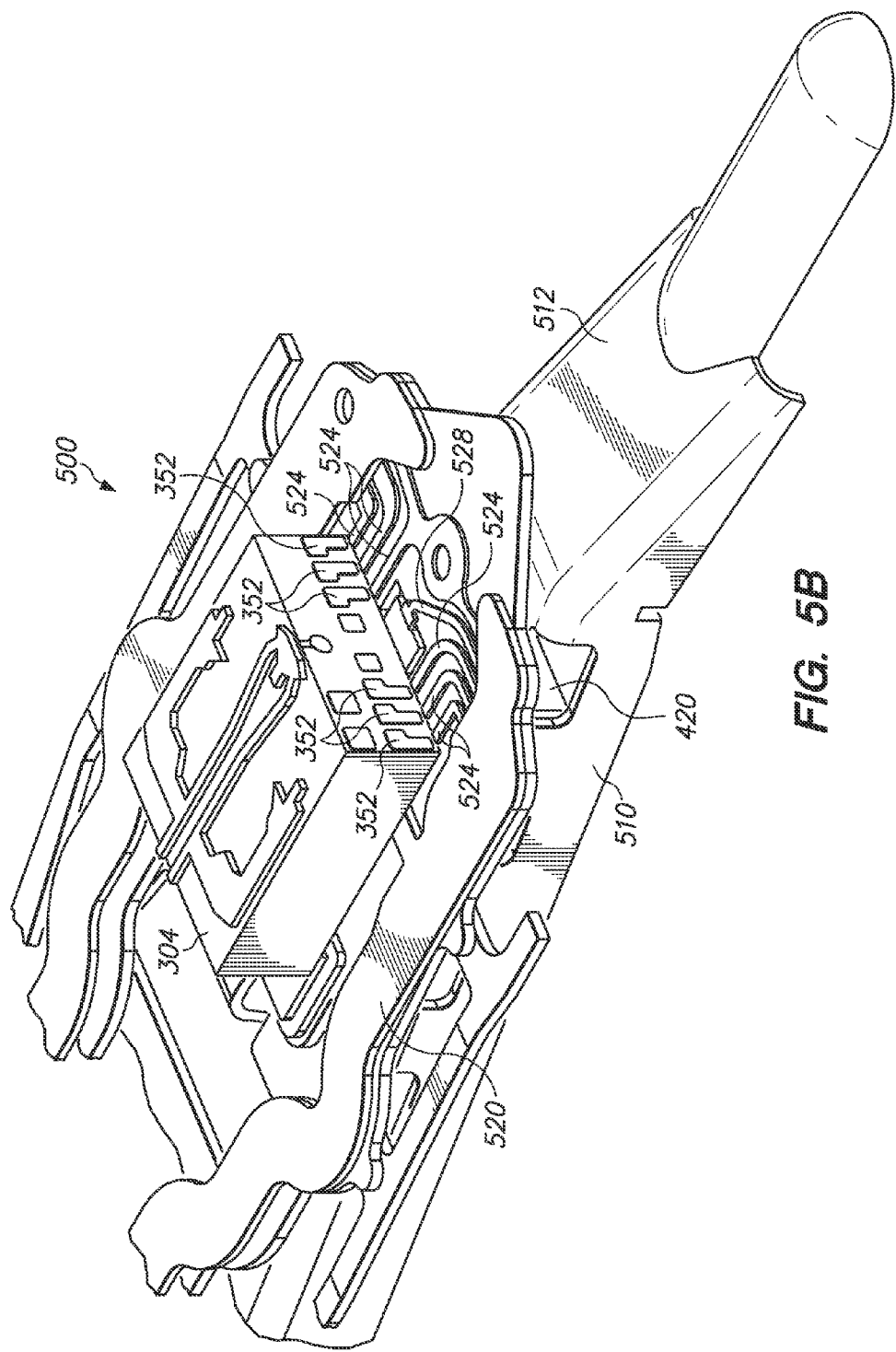
FIG. 5B is a perspective view of the distal portion of the head gimbal assembly (HGA) of FIG. 5A, except with the head being attached to a tongue of the suspension assembly.

FIG. 5A is a perspective view of the distal portion of a head gimbal assembly (HGA) 500 according to an embodiment of the present invention, with a head 304 (and mounted laser diode 410 and laser submount 420) being exploded away from a suspension assembly 510 of the HGA 500. FIG. 5B is a perspective view of the distal portion of the HGA 500 of FIG. 5A, except with the head 304 being attached to a tongue 522 of the suspension assembly 510. Numerical labels in FIGS. 5A and 5B that are common with those used in FIG—. 3, 4A, or 4B are intended to have the same meaning as that described with reference to those figures, and so for conciseness the description of such numerical labels may not be repeated in the description of FIGS. 5A and 5B.

Now referring to the embodiment of FIGS. 5A and 5B, the suspension assembly 510 comprises a load beam 512 and a flexure 520. The flexure 520 includes a tongue 522 on which the read head 304 may be mounted. A first side of the tongue 522 may be in contact with the load beam 512, for example via a conventional dimple 514 that transfers a preload force (also known as a "gram load") from the load beam 512 to the head 304 to preload the head 304 against the surface of a rotating disk during disk drive operation.

Still referring to the embodiment of FIGS. 5A and 5B, the flexure 520 is a laminar flexure that includes a patterned electrically conductive layer that has six conductive traces 524, two conductive traces 526, and a conductive trace 528. The conductive traces may comprise copper, for example. The magnetic transducer 350 is electrically accessed through a subset of the head bond pads 352. Each of the head bond pads 352 is preferably electrically connected to a respective one of the conductive traces 524 by a conductive ball (not shown), for example by gold ball bonding or other applicable conventional methods. Hence, in the embodiment of FIG. 5A, the magnetic transducer 350 is electrically connected to a subset of the conductive traces 524, but is not connected to the conductive traces 526 or 528.

As shown in FIGS. 5A and 5B, the laser diode 410 passes through the opening 516 in the suspension assembly 510, and the laser diode 410 is electrically connected to (by making electrical contact with) at least the conductive trace 528, but is not connected to the conductive traces 524. The laser diode 410 may be electrically connected to the conductive traces 526, via a conductive path on or through the laser submount 420 that contacts the conductive traces 526. The conductive traces 524, 526, and 528 extend along the flexure 520, via an elongated flexure tail to electrical connections with an actuator flexible printed circuit (e.g. FPC 262, as shown in FIG. 2).

Figure 6A:
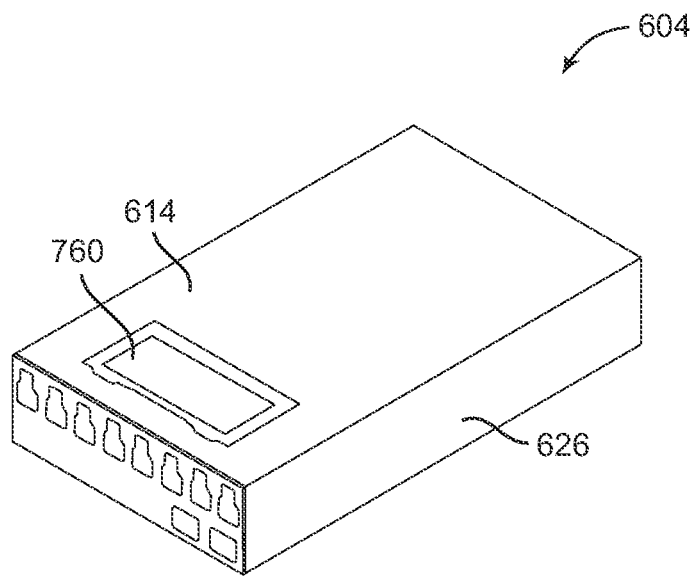
FIG. 6A depicts a head according to an embodiment of the present invention, as viewed from a perspective angle towards the mounting surface of the head.
Figure 6B:
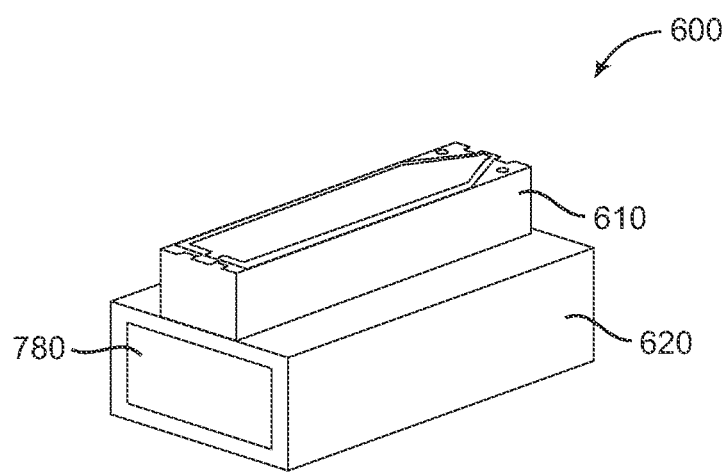
FIG. 6B depicts a laser submount assembly according to an embodiment of the present invention.

FIG. 6A depicts a head 604 according to an embodiment of the present invention, as viewed from a perspective angle towards the mounting face 614 of the slider 626 of the head 604. FIG. 6B depicts a laser submount assembly 600 according to an embodiment of the present invention. A first plurality of layers 760 has been deposited on the mounting face 614 of the slider 626. The first plurality of layers 760 may be used to help create a reliable solder bond between the laser submount assembly 600 and the mounting face 614 of the slider 626. Examples of the composition of the first plurality of layers 760 before and after the soldering process will be described subsequently herein.

In the embodiment of FIG. 6B, the laser submount assembly 600 comprises a laser diode 610 that is attached to a laser submount 620, for example by an 80Au20Sn solder material (not shown in FIG. 6B) between the laser diode 610 and the laser submount 620. A second plurality of layers 780 may be deposited on a face of the the laser submount 620 that faces the mounting face 614 of the slider 626. The second plurality of layers 780 may be used to help create a reliable solder bond between the laser submount 620 and the mounting face 614 of the slider 626. Examples of the composition of the second plurality of layers 780 before and after the soldering process will be described subsequently herein.

Figure 7:
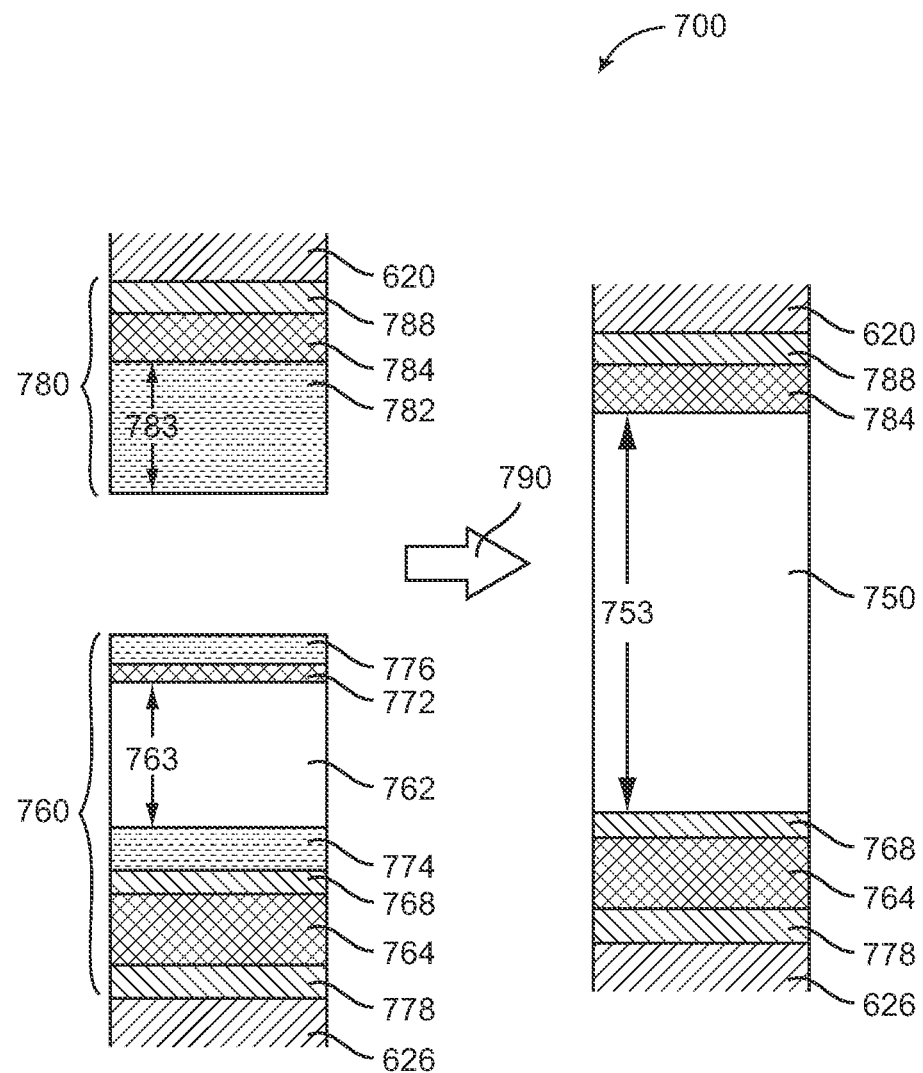
FIG. 7 depicts a layer system for soldering a laser submount to a head according to an embodiment of the present invention, before and after the soldering process.

FIG. 7 depicts a layer system 700 for soldering the laser submount 620 to the slider 626 (e.g. the mounting face 614 of the slider 626 of FIG. 6A), according to an embodiment of the present invention before and after the soldering process. Now referring to FIG. 7, prior to the soldering process, the first plurality of layers 760 includes a tin layer 762 and a first underlayer 764 that comprises platinum. In certain embodiments, the tin layer 762 defines a tin layer thickness 763 that is preferably but not necessarily in the range of 1.5 to 3.5 microns. In certain embodiments, the first underlayer 764 defines a first underlayer thickness that is preferably in the range of 50 nm to 250 nm.

In the embodiment of FIG. 7, the first plurality of layers 760 includes an interface layer 768 disposed between the first underlayer 764 and the tin layer 762. The interface layer 768 preferably comprises Ti, V, Cr, Zr, Nb, Mo, Hf, Ta, or W, and preferably defines an interface layer thickness in the range of 5 nm to 20 nm. In certain embodiments, such an interface layer 768 may enhance the shear strength of a resulting solder attachment.

In the embodiment of FIG. 7, prior to the soldering process the second plurality of layers 780 may include a first gold layer 782 and a second underlayer 784 that comprises platinum. In certain embodiments, the first gold layer 782 defines a first gold layer thickness 783 that is at least 0.31 times the tin layer thickness 763. Such an inequality may advantageously provide that a solder layer 750 that ultimately results from the soldering process will have a desired composition, as described subsequently herein. In certain embodiments, the first gold layer thickness 783 may consequently fall in the range of 0.5 to 1 micron. In certain embodiments, the second underlayer 784 may have a thickness that is preferably but not necessarily in the range of 100 nm to 300 nm.

In the embodiment of FIG. 7, the first plurality of layers 760 optionally includes a platinum capping layer 772, a second gold layer 774 and a third gold layer 776. The platinum capping layer 772 is shown in FIG. 7 to be in direct contact with the tin layer 762, with the tin layer 762 being disposed between the platinum capping layer 772 and the interface layer 768. In certain embodiments, the platinum capping layer 772 may define a capping layer thickness that is preferably in the range of 5 nm to 20 nm. In certain embodiments, such a platinum capping layer 772 acts as a diffusion barrier that may prevent an adjacent gold layer (e.g. the third gold layer 776 and/or the first gold layer 782) from dissolving into the tin layer 762, prior to the intentional melting of the tin layer 762 during the soldering process.

In the embodiment of FIG. 7, the second gold layer 774 is disposed between the tin layer 762 and the interface layer 768. In certain embodiments, the second gold layer 774 may have a thickness that is preferably in the range of 50 to 200 nm. Because the second gold layer 774 is not separated from the tin layer 762 by a diffusion barrier like the platinum capping layer 772, gold may diffuse from the second gold layer 774 into the tin layer 762 to advantageously lower the melting point of the tin layer 762. In the embodiment of FIG. 7, the third gold layer 776 is disposed on the platinum capping layer 772, for example to protect the platinum capping layer 772 from hydrocarbon contaminates. In certain embodiments, the third gold layer 776 has a thickness that is preferably in the range of 20 nm to 80 nm.

In the embodiment of FIG. 7, the first plurality of layers 760 may include a first metal adhesion layer 778. The first metal adhesion layer 778 is depicted in FIG. 7 to be between and in contact with the first underlayer 764 and the slider 626 (e.g. at the mounting face 614 shown in FIG. 6A). In certain embodiments, for example if the slider 626 comprises AlTiC, the first metal adhesion layer 778 may preferably comprise Ti. In alternative embodiments, the first metal adhesion layer 778 may optionally comprise Cr, Nb, Ta, Ni, or W or their alloys.

In the embodiment of FIG. 7, the second plurality of layers 780 may include a second metal adhesion layer 788. The second metal adhesion layer 788 is depicted in FIG. 7 to be disposed between and in contact with the second underlayer 784 and the submount 620. The second metal adhesion layer 788 may optionally comprise Ti, Cr, Nb, Ta, Ni, or W.

In FIG. 7, the arrow 790 represents the soldering process steps of positioning the laser submount 620 adjacent to the first plurality of layers 760 on the slider 626, and then heating the layer system 700 (including the first plurality of layers 760) to a process temperature (e.g. 250° C.), that is high enough to melt the tin layer 762. On the left of the arrow 790 is depicted the layer system 700 before the soldering process, and on the right of the arrow 790 is depicted the layer system 700 after the soldering process. In certain embodiments, positioning the laser submount 620 adjacent to the first plurality of layers 760 may comprise pressing the second plurality of layers 780 against the first plurality of layers 760.

When the tin layer 762 is melted, the platinum capping layer 772 can no longer prevent the first gold layer 782 (and the third gold layer 776 if present) from dissolving into the tin layer 762, and so the gold-tin solder layer 750 is thereby formed. The second gold layer 774 (if present) also dissolves into the tin layer 762. After dissolution of the gold into the gold-tin solder layer 750, the gold tin solder layer 750 preferably comprises an alloy of at least 45% gold by weight dissolved in tin. In certain embodiments, the gold tin solder layer 750 of FIG. 7 may define a solder layer thickness 753 that is optionally in the range of 0.5 microns to 5 microns, and preferably in the range 1 micron to 3 microns.

Figure 8:
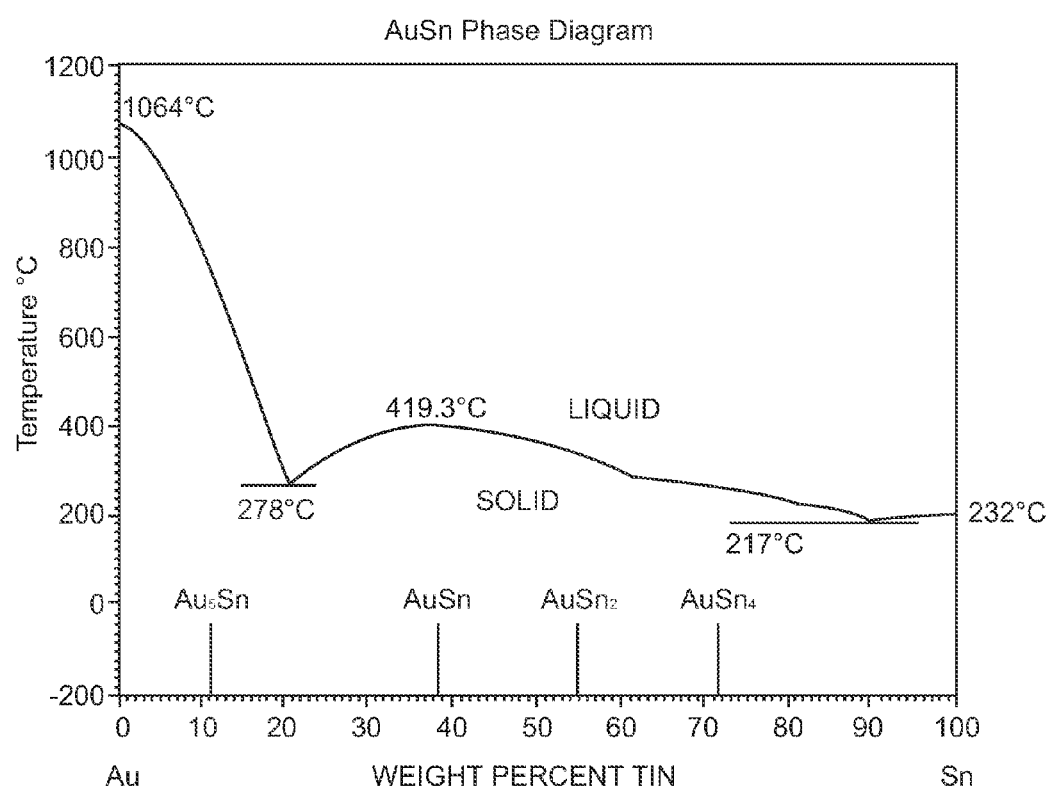
FIG. 8 depicts a conventional phase diagram of gold-tin solder alloy.
Figure 9:
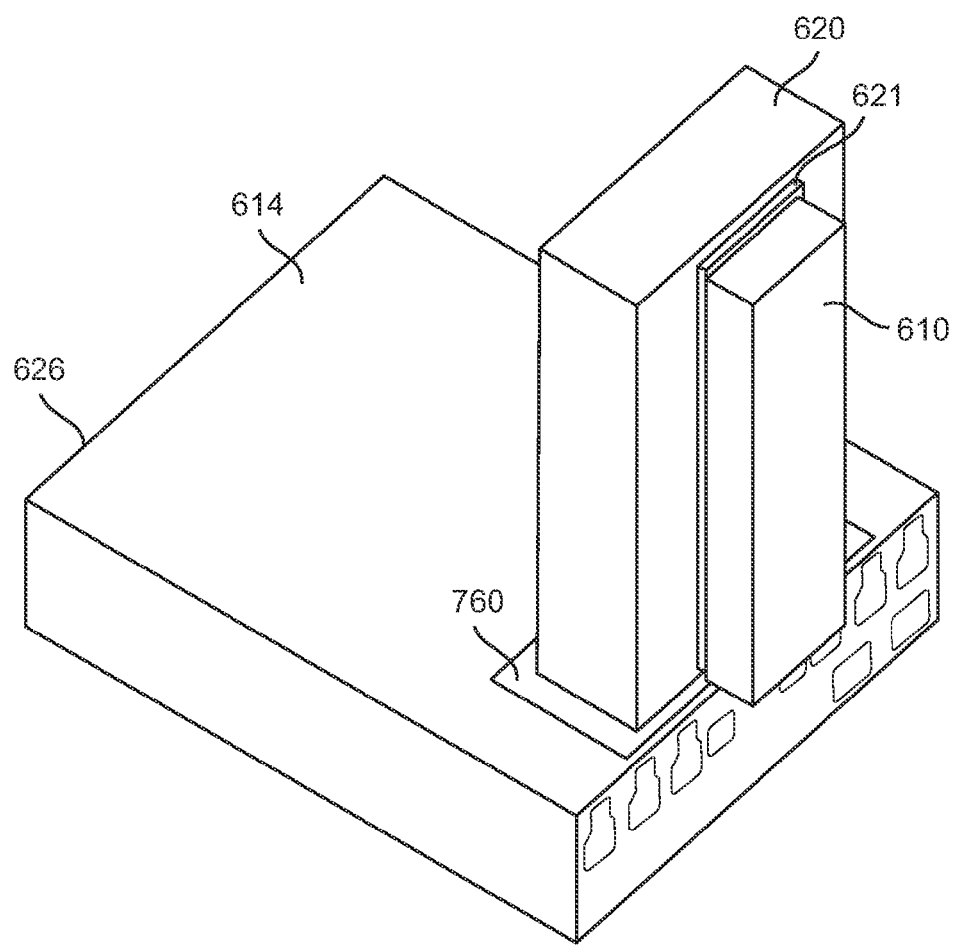
FIG. 9 depicts a head having a laser submount assembly soldered thereto according to an embodiment of the present invention.

As can be seen from the conventional gold-tin alloy phase diagram of FIG. 8, such a gold-tin solder alloy of at least 45% gold by weight has a melting point that is higher than that of 10Au90Sn (217° C.) and tin (232° C.), and preferably higher than a process temperature used for the soldering (e.g. 250° C.). Therefore, the gold-tin solder layer 750 promptly freezes back to solid form, attaching the laser submount 620 to the slider 626 as shown in FIG. 9. Some of the numerical labels used in FIG. 9 have the same meaning as corresponding numbers in FIGS. 6A and 6B, and so for conciseness such numerical labels are not re-described here. In the embodiment of FIG. 9, the laser submount 620 includes a patterned metal layer 621 upon which a solder material (e.g. eutectic 80Au20Sn, not shown) may be deposited for attachment of the laser diode 610 to the laser submount 620.

Figure 10:
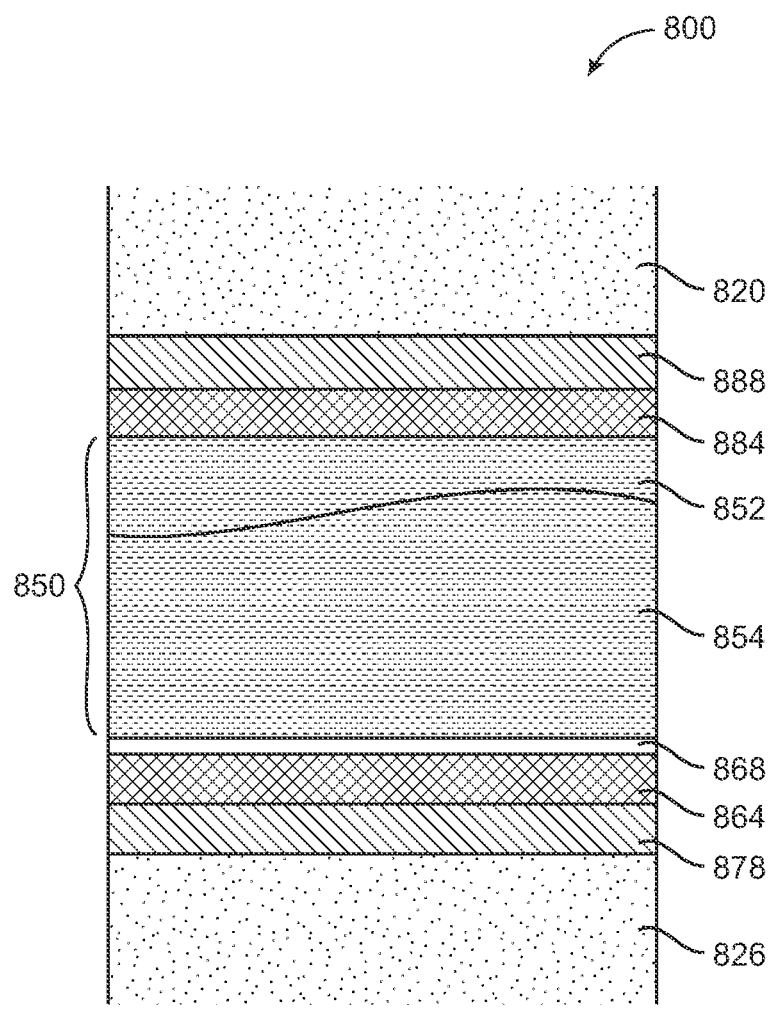
FIG. 10 depicts a layer system for soldering a laser submount to a slider, according to another embodiment of the present invention, after the soldering process.

FIG. 10 depicts a solder layer system 800 for soldering a laser submount 820 to a slider 826, according to another embodiment of the present invention, after the soldering process. The layer system 800 optionally includes a first underlayer 864 that comprises platinum. In certain embodiments, the first underlayer 864 defines a first underlayer thickness that is preferably in the range of 50 nm to 250 nm. In the embodiment of FIG. 10, the solder layer system 800 optionally further includes a second underlayer 884 that comprises platinum. The second underlayer 884 is disposed between the laser submount 820 and a gold-tin solder layer 850.

In the embodiment of FIG. 10, the solder layer system 800 includes an interface layer 868 disposed between the first underlayer 864 and the gold-tin solder layer 850. The interface layer 868 preferably comprises Ti, V, Cr, Zr, Nb, Mo, Hf, Ta, or W, and preferably defines an interface layer thickness in the range of 5 nm to 20 nm. In certain embodiments, such an interface layer 868 may enhance the shear strength of a resulting solder attachment.

In the embodiment of FIG. 10, the solder layer system 800 may include a first metal adhesion layer 878. The first metal adhesion layer 878 is depicted in FIG. 10 to be between and in contact with the first underlayer 864 and the slider 826. In certain embodiments, for example if the slider 826 comprises AlTiC, the first metal adhesion layer 878 may preferably comprise Ti. In alternative embodiments, the first metal adhesion layer 878 may optionally comprise Cr, Nb, Ta, Ni, or W.

In the embodiment of FIG. 10, the solder layer system 800 may include a second metal adhesion layer 888. The second metal adhesion layer 888 is depicted in FIG. 10 to be disposed between and in contact with the second underlayer 884 and the laser submount 820. The second metal adhesion layer 888 may optionally comprise Ti, Cr, Nb, Ta, Ni, or W.

In the embodiment of FIG. 10, the gold-tin solder layer 850 optionally includes a region 852 of AuSn composition adjacent to and in contact with the second underlayer 884, and a region 854 of $AuSn_2$ composition adjacent to and in contact with the interface layer 868. In certain embodiments, the the gold-tin solder layer 850 preferably does not include a region of $AuSn_4$ composition. Such a result can be obtained by careful selection of the thicknesses of gold and tin layers, as deposited on the parts to be soldered prior to the soldering process (e.g. on the laser submount 820 and on the slider 826 prior to the soldering process).

For example, now referring to FIG. 7, the overall composition of the gold-tin solder layer 750 can be controlled by careful choice of the thickness 783 of the first gold layer 782, the thicknesses of the second and third gold layers 774 and 776, and the thickness 763 of the tin layer 762. Specifically, so long as the sum of the thicknesses of the aforementioned gold layers is at least 0.31 times the tin layer thickness 763, then the gold tin solder layer 750 overall will comprises at least 45% gold by weight dissolved in tin.

Now referring again to the gold-tin alloy phase diagram of FIG. 8, the foregoing inequalities may advantageously reduce the likelihood that the solder layer 750 will include regions of $AuSn_4$ intermetallic phase, which in certain embodiments can have undesirable brittle mechanical properties that might cause the solder layer 750 to form a less reliable attachment. Therefore, the methods and structures disclosed herein may practically improve the reliability of the attachment of a laser light source for EAMR to a read head.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

I claim:

1. A head comprising:
   a slider having an air bearing surface, a trailing face that is normal to the air bearing surface, and a mounting face that is opposite but substantially parallel to the air bearing surface;
   a magnetic transducer disposed on the trailing face of the slider; and
   a submount attached to the mounting face by a first solder layer, the first solder layer comprising an alloy of at least 45% gold by weight dissolved in tin;
   a laser diode attached to the submount,
   wherein the mounting face of the slider includes a first underlayer that comprises platinum, and an interface layer disposed between and in direct contact with the first underlayer and the first solder layer, the interface layer comprising a metal selected from the group consisting of Ti, V, Cr, Zr, Nb, Mo, Hf, Ta, and W.

2. The head of claim 1, wherein the submount includes a second underlayer that comprises platinum, the second underlayer disposed between the submount and the first solder layer.

3. The head of claim 1, wherein the first solder layer includes a region of AuSn composition adjacent to and in contact with the second underlayer of the submount, and a region of $AuSn_2$ composition adjacent to and in contact with the interface layer of the mounting face of the slider.

4. The head of claim 1, wherein the mounting face of the slider further comprises a first metal adhesion layer between and in contact with the first underlayer and the mounting face of the slider, the first metal adhesion layer comprising Ti.

5. The head of claim 2, wherein the submount further comprises a second metal adhesion layer between and in contact with the second underlayer and the submount, the second metal adhesion layer comprising a metal selected from the group consisting of Ti, Cr, Nb, Ta, Ni, and W.

6. The head of claim 1, wherein the interface layer defines an interface layer thickness in the range of 5 nm to 20 nm, and the first underlayer defines a first underlayer thickness in the range of 50 nm to 250 nm.

7. The head of claim 1, wherein the laser diode is attached to the submount by a second solder layer that comprises 80Au20Sn.

8. The head of claim 1, wherein the first solder layer defines a solder layer thickness in the range 1 micron to 3 microns.

9. A method to manufacture a head, the method comprising:
providing a slider having an air bearing surface, a trailing face that is normal to the air bearing surface, and a mounting face that is opposite but substantially parallel to the air bearing surface;
depositing a first plurality of layers on the mounting face of the slider, the first plurality of layers including a tin layer, a first underlayer that comprises platinum, and an interface layer disposed between the first underlayer and the tin layer, the interface layer comprising a metal selected from the group consisting of Ti, V, Cr, Zr, Nb, Mo, Hf, Ta, and W;
positioning a laser submount adjacent to the first plurality of layers; and then heating the first plurality of layers to melt the tin layer.

10. The method of claim 9, wherein the slider comprises AlTiC, and wherein the first plurality of layers further includes a first metal adhesion layer between and in contact with the mounting face of the AlTiC slider and the first underlayer, the first metal adhesion layer comprising titanium.

11. The method of claim 9, wherein the first plurality of layers further includes a platinum capping layer in direct contact with the tin layer, the tin layer disposed between the platinum capping layer and the interface layer, the platinum capping layer defining a capping layer thickness in the range of 5 nm to 20 nm.

12. The method of claim 9, wherein the tin layer defines a tin layer thickness in the range of 1.5 to 3.5 microns, the interface layer defines an interface layer thickness in the range of 5 nm to 20 nm, and the first underlayer defines a first underlayer thickness in the range of 50 nm to 250 nm.

13. The method of claim 9, further comprising depositing a second plurality of layers on the laser submount before positioning the laser submount adjacent to the first plurality of layers, the second plurality of layers including a first gold layer and a second underlayer that comprises platinum.

14. The method of claim 13, wherein the tin layer defines a tin layer thickness, and wherein the first gold layer defines a first gold layer thickness that is at least 0.31 times the tin layer thickness.

15. The method of claim 14, wherein the first gold layer thickness is in the range of 0.5 to 1 micron, and the second underlayer defines a second underlayer thickness in the range of 100 nm to 300 nm.

16. The method of claim 13, wherein the second plurality of layers further includes a second metal adhesion layer between and in contact with the laser submount and the second underlayer, the second metal adhesion layer comprising a metal selected from the group consisting of Ti, Cr, Nb, Ta, Ni, and W.

17. The method of claim 13, wherein heating the first plurality of layers to melt the tin layer dissolves the first gold layer into the tin layer to form a solder layer of gold tin alloy that has at least 45% gold by weight.

18. The method of claim 17, wherein the solder layer includes a region of AuSn composition adjacent to and in contact with the second underlayer, and a region of $AuSn_2$ composition adjacent to and in contact with the interface layer.

19. The method of claim 17, wherein the first plurality of layers further includes a second gold layer, and wherein heating the first plurality of layers to melt the tin layer also dissolves the second gold layer into the tin layer to form the solder layer of gold tin alloy that has at least 45% gold by weight.

20. The method of claim 19, wherein the tin layer defines a tin layer thickness, wherein the first gold layer defines a first gold layer thickness, wherein the second gold layer defines a second gold layer thickness, and wherein a sum of the first gold layer thickness and the second gold layer thickness is at least 0.31 times the tin layer thickness.

21. The method of claim 20, wherein the second gold layer is disposed between the tin layer and the interface layer, and defines a second gold layer thickness in the range of 50 to 200 nm.

22. The method of claim 20, wherein the first plurality of layers further includes a platinum capping layer in direct contact with the tin layer, the tin layer being disposed between the platinum capping layer and the interface layer, the platinum capping layer defining a capping layer thickness in the range of 5 nm to 20 nm, and wherein the second gold layer is disposed on the platinum capping layer and defines a second gold layer thickness in the range of 20 nm to 80 nm.

23. The method of claim 9, further comprising attaching a laser diode to the laser submount by a solder material that comprises 80Au20Sn, before positioning the laser submount adjacent to the first plurality of layers.

24. The method of claim 13, wherein positioning the laser submount adjacent to the first plurality of layers comprises pressing the second plurality of layers against the first plurality of layers.

* * * * *